United States Patent [19]

Thöne et al.

[11] Patent Number: 5,370,850
[45] Date of Patent: Dec. 6, 1994

[54] PROCESS FOR CATALYTICALLY REDUCING NITROGEN OXIDES IN COMBUSTION EXHAUST GASES

[75] Inventors: Bernd Thöne, Friedberg; Gerhard Schmidt, Karben, both of Germany

[73] Assignee: Metallgesellschaft Aktiengesellschaft, Frankfurt am Main, Germany

[21] Appl. No.: 135,299

[22] Filed: Oct. 12, 1993

[30] Foreign Application Priority Data

Oct. 21, 1992 [DE] Germany ............... 4235411

[51] Int. Cl.$^5$ ............... B01J 8/00; C01B 21/00
[52] U.S. Cl. ............... 423/239.1; 423/239.2; 95/58; 95/108
[58] Field of Search ............... 423/239.1, 239.2; 95/58, 108

[56] References Cited

U.S. PATENT DOCUMENTS 5,219,543  6/1993  Weisweiler et al. ............... 423/239

FOREIGN PATENT DOCUMENTS 0249426 12/1987 European Pat. Off. .
2504027  8/1975 Germany .
3701527  8/1988 Germany .
4039213  6/1992 Germany .
4125004  1/1993 Germany .

OTHER PUBLICATIONS

The Condensed Chemical Dictionary, Gessner Hawley, 1981 p. 986.
Aldrich, 1990 p. 768.

*Primary Examiner*—Michael Lewis
*Assistant Examiner*—Steven Bos
*Attorney, Agent, or Firm*—Herbert Dubno

[57] ABSTRACT

A combustion exhaust gas which is to be dedusted and denitrated is mixed with $NH_3$ and at temperatures in the range of about 250° to 600° C. is passed through a fluidized bed. The fluidized bed contains a denitrating catalyst, which contains $FeSO_4$. The combustion exhaust gas serves as a fluidizing gas in the fluidized bed. Fresh denitrating catalyst is supplied to the fluidized beg and comprises at least 90% by weight $FeSO_4$, which contains water of crystallization and has particle size in the range from 1 to 150 micrometers. The treated exhaust gas is dedusted in an electrostatic precipitator.

4 Claims, 1 Drawing Sheet

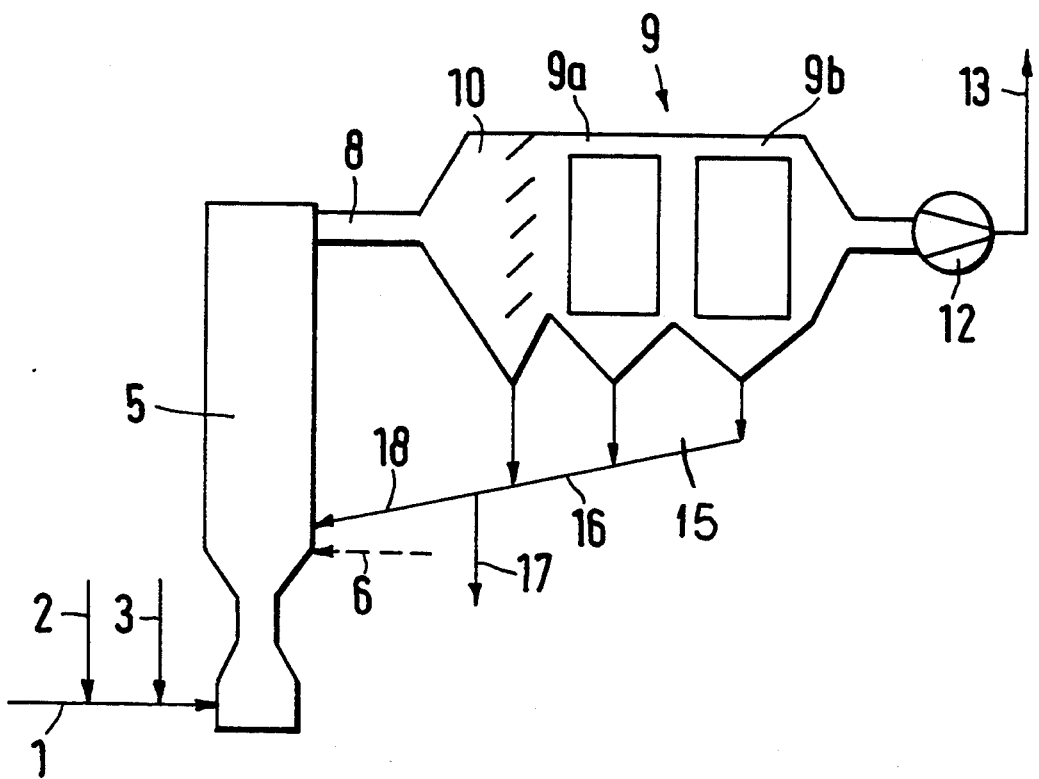

PROCESS FOR CATALYTICALLY REDUCING NITROGEN OXIDES IN COMBUSTION EXHAUST GASES

FIELD OF THE INVENTION

Our present invention relates to a process of dedusting and denitrating a combustion exhaust or flue gas. More particularly this invention relates to the treatment of a flue gas wherein the combustion gas is mixed with $NH_3$ and is passed at temperatures in the range from about 250° to 600° C. as a fluidizing gas through a fluidized bed which contains a denitrating catalyst in the form of $FeSO_4$, and solids are separated in an electrostatic precipitator.

BACKGROUND OF THE INVENTION

A process wherein $NH_3$ is added to reduce $NO_x$ in a flue or combustion gas is described in Published German Patent Application 37 01 527. In that process a denitrating catalyst is employed which contains, inter alia, $FeSO_4$ on a carrier, such as $SiO_2$.

OBJECTS OF THE INVENTION

It is therefore an object of the present invention to so improve the known process as to achieve an improved separation of solids in the electrostatic precipitator.

This object is accomplished in accordance with the invention by supplying the fluidized bed with fresh denitrating catalyst, which comprises at least 90% by weight $FeSO_4$, which contains water of crystallization and which has a particle size in the range from 1 to 150 micrometers.

The catalyst, which comprises $FeSO_4$ that contains water of crystallization and has a very small particle size is not separated in the entrance portion of the electrostatic precipitator. Rather the fine-grained catalyst passes through the entire electrostatic precipitator to be at least partly removed in the final stages thereof and improves in the electrostatic precipitator the separation of the other solids contained in the exhaust gas, while being ultimately sufficiently separated at the same time.

The $FeSO_4$ which contains water of crystallization and is to be used as a denitrating catalyst consists particularly of $FeSO_4.1H_2O$ and is a relatively inexpensive substance. It has also the advantage that there is no need for a carrier material and the $FeSO_4$ which contains water of crystallization can be used as a commercially pure material as a fresh denitrating catalyst. The desired small particle size can be obtained by grinding.

The effectiveness to assist the separation of dusts even in those fields of an electrostatic precipitator which are flown through last depends particularly on the proportion of the smallest particles of the catalyst. For this reason it is recommended that the fresh denitrating catalyst comprising $FeSO_4$ which contains water of crystallization comprises at least 60% by weight of particles having a size in the range from 1 to 60 micrometers and at least 10% by weight of particles having sizes not in excess of 40 micrometers.

When the $FeSO_4$ which contains water of crystallization is used as a fresh denitrating catalyst without a carrier, the catalyst should comprise at least 90% by weight $FeSO_4$, which contains water of crystallization and has particle sizes in the range from 1 to 150 micrometers, the balance being common inert impurities as are usually present in the technical grade crystalline product.

More particularly, the process according to the invention involves:

(a) mixing a flue gas to be dedusted and denitrated with $NH_3$;

(b) passing the flue gas mixed with $NH_3$ at a temperature of 250° C. to 600° C. as a fluidizing gas through a fluidized bed containing a denitrating catalyst comprised essentially of $FeSO_4$;

(c) entraining solids in a denitrated gas withdrawn from said fluidized bed;

(d) separating solids from the denitrated gas in an electrostatic precipitator so that solids containing $FeSO_4$ are present in all fields of electrostatic precipitation; and (e) supplying to said fluidized bed as the fresh denitrating catalyst solids comprising at least 90% by weight $FeSO_4$, containing water of crystallization and in a particle size range consisting essentially of 1 to 150 micrometers.

BRIEF DESCRIPTION OF THE DRAWING

The above and other objects, features and advantages of the invention will become more readily apparent from the following description, reference being made to the accompanying highly diagrammatic drawing in which the sole FIGURE of which is a flow diagram illustrating the process.

SPECIFIC DESCRIPTION

The flue gas which contains various nitrogen oxides ($NO_x$) and is to be dedusted and to be denitrated is supplied in line 1, e.g. from the combustion chamber or boiler of a fossil fuel power plant. The flue gas is supplied through line 2 with $NH_3$ and through line 3 with fresh denitrating catalyst. The supply of $NH_3$ is controlled to add about 0.8 to 1.2 moles of $NH_3$ per mole of $NO_x$ in the exhaust gas in line 1.

The fresh denitrating catalyst added in line 3 comprises at least 90% by weight $FeSO_4$ which contains water of crystallization and consists of particles having a size in the range from 1 to 150 micrometers.

The $FeSO_4$ which contains water of crystallization and is used as a denitrating catalyst is ground to such a small particle size that it comprises at least 60% by weight particles having a size in the range from 1 to 60 micrometers and at least 10% by weight particles having a size not in excess of 40 micrometers.

Temperatures from about 250° to 600° C., preferably from 300° to 500° C., are maintained in the fluidized bed reactor 5. The gas velocities in the reactor 5 lie usually in the range from 2 to 12 m/s, preferably in the range from 4 to 10 m/s, such as are used in a circulating fluidized bed.

The process may be carried out in such a manner that the reactor 5 is used not only to reduce nitrogen oxides to molecular nitrogen but also to chemically react $SO_2$ and $SO_3$. For desulfurizing, the reactor 5 is supplied through line 6 indicated by a broken line with $Ca(OH)_2$ or $CaO$, preferably in a solid state. Other desulfurizing agents, such as $MgO$, may also be employed.

The solids-laden exhaust gas to be dedusted is fed through the line 8 to an electrostatic precipitator 9, which is preceded by a mechanical coarse separator 10 such as a cyclone or an impingement baffle separator. The electrostatic precipitator comprises a plurality of fields 9a and 9b, in which the solids are electrostatically precipitated. In the present process it is important that a residual amount of $FeSO_4$ which is as fine as dust is carried by the exhaust gas as far as to the last field $9b$ because the $FeSO_4$ will improve the simultaneous separation of other dusts.

Upstream of the chimney 13, we provide a fan 12. The filtered flue gas can have residual solid contents in a range below 30 mg/sm$^3$ (sm$^3$=standard cubic meter or m$^3$ S.T.P.).

The solids which are separated in the last field $9b$ and fall into the dust bin 15 usually contain at least 20% by weight and preferably at least 30% by weight iron sulfate.

The solids which have been separated in various regions of the electrostatic precipitator 9 and in the coarse separator 10 fall into the collecting line 16 and are removed from the process in part through line 17 whereas the remainder is recycled to the reactor 5 through the line 18.

EXAMPLES

In a pilot size arrangement corresponding to that shown on the drawing, the fluidized bed reactor 5 is fed at a rate of 3200 sm$^3$/h with flue gas from a coal-fired furnace. The flue gas in line 1 has a temperature of 450° C. The flue gas contains the following pollutants:

| Fly ash | 6 g/sm$^3$ |
| --- | --- |
| NO$_x$ | 470 mg/sm$^3$ |
| SO$_2$ | 1800 mg/sm$^3$ |

In the experiments to be described hereinafter, NH$_3$ at a rate of 0.31 kg/h is admixed through line 2 to the flue gas.

In the first experiment, commercially available iron sulfate is employed and at a rate of 8 g/sm$^3$ is added through line 3 to the flue gas. In the second experiment carried out in accordance with the invention, ground iron sulfate, which contains water of crystallization and has been dried at temperatures 300° C., is used at a rate of 2 g/sm$^3$. The particle size distribution of the catalyst is apparent from the following Table:

| Particle size range | First experiment | Second experiment |
| --- | --- | --- |
| 0 to 40 μm | 25.1% by weight | 82.2% by weight |
| 40 to 60 μm | 8.7% by weight | 13.3% by weight |
| 60 to 150 μm | 3.9% by weight | 3.6% by weight |
| larger than 250 μm | 62.3% by weight | 0.9% by weight |

The following results are produced in the two experiments:

| | First experiment | Second experiment |
| --- | --- | --- |
| In the pure gas in line 13: | | |
| NO$_x$ | 80 mg/sm$^3$ | 80 mg/sm$^3$ |
| SO$_2$ | 200 mg/sm$^3$ | 160 mg/sm |
| Fly ash | 100 mg/sm$^3$ | 20 mg/sm$^3$ |
| FeSO$_4$ content in the dust which is separated in the last field 9b of the electrostatic precipitator | 10% by weight | 40% by weight |

If the first experiment is carried out with the commercially available iron sulfate supplied at a rate of only 2 g/sm$^3$, the pure gas in line 13 contains the following pollutants:

| NO$_x$ | 120 mg/sm$^3$ |
| --- | --- |
| SO$_2$ | 400 mg/sm$^3$ |
| Fly ash | 180 mg/sm$^3$ |

We claim:
1. A process for dedusting and denitrating a flue gas which comprises the steps of:
   (a) mixing a flue gas to be dedusted and denitrated with NH$_3$;
   (b) passing the flue gas mixed with NH$_3$ at a temperature of 250° to 600° C. as a fluidizing gas through a fluidized bed containing a denitrating catalyst consisting essentially of FeSO$_4$;
   (c) entraining solids in a denitrated gas withdrawn from said fluidized bed;
   (d) separating solids from the denitrated gas in an electrostatic precipitator having a plurality of fields traversed in succession by the denitrated gas so that solids containing FeSO$_4$ are present in fields of electrostatic precipitation, and at least 20% by weight of iron sulfate is separated in a mixture of solids in the last of said fields to be traversed by the denitrated gas; and
   (e) supplying to said fluidized bed fresh denitrating catalyst solids comprising at least 90% by weight FeSO$_4$, containing water of crystallization, and in a particle size range consisting essentially of 1 to 150 micrometers, wherein at least 60% by weight of the FeSO$_4$ particles have a particle size in the range of 1 to 60 micrometers, and at least 10% by weight of the FeSO$_4$ particles have a particle size not in excess of 40 micrometers.

2. The process for dedusting and denitrating a flue gas defined in claim 1 wherein according to step (e) the FeSO$_4$ containing water of crystallization is FeSO$_4$.1-H2O.

3. The process defined in claim 1, further comprising the step of returning catalyst collected from each of said fields to said fluidized bed.

4. The process defined in claim 1, further comprising the step of introducing a solid sulfur oxide binding compound to said fluidized bed.

* * * * *